US011648523B2

(12) United States Patent
Rosenquist et al.

(10) Patent No.: US 11,648,523 B2
(45) Date of Patent: *May 16, 2023

(54) METHOD AND SYSTEM FOR MANUFACTURING OF BIOPHARMACEUTICAL PRODUCTS

(71) Applicant: Cytiva Sweden AB, Uppsala (SE)

(72) Inventors: Johan Rosenquist, Uppsala (SE); Daria Donati, Uppsala (SE); Mia Margareta Elisabet Bennemo, Uppsala (SE)

(73) Assignee: Cytiva Sweden AB, Uppsala (SE)

(*) Notice: Subject to any disclaimer, the term of this patent is extended or adjusted under 35 U.S.C. 154(b) by 0 days.

This patent is subject to a terminal disclaimer.

(21) Appl. No.: 17/381,588

(22) Filed: Jul. 21, 2021

(65) Prior Publication Data

US 2022/0001350 A1    Jan. 6, 2022

Related U.S. Application Data

(63) Continuation of application No. 16/763,787, filed as application No. PCT/EP2018/081416 on Nov. 15, 2018, now Pat. No. 11,103,846.

(30) Foreign Application Priority Data

Nov. 16, 2017  (GB) ..................... 1718917

(51) Int. Cl.
*B01J 19/00* (2006.01)
*B01J 4/00* (2006.01)
*B01J 19/24* (2006.01)

(52) U.S. Cl.
CPC ............. *B01J 19/004* (2013.01); *B01J 4/008* (2013.01); *B01J 19/245* (2013.01);
(Continued)

(58) Field of Classification Search
CPC .. E04H 1/005; E04H 5/02; B01J 19/24; B01J 19/245; B01J 19/004; B01J 2219/0002;
(Continued)

(56) References Cited

U.S. PATENT DOCUMENTS 7,985,382 B1    7/2011  Henry et al.
2008/0107935 A1  5/2008  Degertekin et al.
(Continued)

FOREIGN PATENT DOCUMENTS

CA         1294169 C      1/1992
CN       107356128 A     11/2017
(Continued)

OTHER PUBLICATIONS

PCT International Search Report and Written Opinion for PCT Application No. PCT/EP2018/081416 dated Feb. 1, 2019 (11 pages).
(Continued)

*Primary Examiner* — Lessanework Seifu
(74) *Attorney, Agent, or Firm* — Eversheds Sutherland (US) LLP (57) ABSTRACT

The present disclosure relates to a volume tailorable manufacturing system for quality assured manufacturing of biosafety level classified biopharmaceutical products and a method for tailoring a production volume capability of a manufacturing system.

The volume tailorable manufacturing system comprises one or more multi-product suites and a control facility configured to control a unidirectional flow in a circulation system of the one or more multi-product suites. The circulation system is configured to interconnect the one or more multi-product suites and comprises separated supply and return systems. The supply system comprising at least one inlet, the return system comprising at least one outlet that is paired with the inlet and provided at a spatially predetermined
(Continued)

position from the inlet, and each inlet/outlet pair comprises a seal when not connected to an adjacent multi-product suite.

18 Claims, 6 Drawing Sheets

(52) U.S. Cl.
CPC .................. *B01J 2219/0002* (2013.01); *B01J 2219/00011* (2013.01); *B01J 2219/00813* (2013.01)

(58) Field of Classification Search
CPC .... B01J 2219/00013; B01J 2219/00015; B01J 2219/00006; B01J 2219/00009
See application file for complete search history.

(56) References Cited

U.S. PATENT DOCUMENTS

| | | |
|---|---|---|
| 2009/0005254 A1 | 1/2009 | Griffiths et al. |
| 2012/0077429 A1 | 3/2012 | Wernimont et al. |
| 2012/0270286 A1 | 10/2012 | Takeuchi et al. |
| 2014/0045704 A1 | 2/2014 | Jovanovich et al. |
| 2015/0203416 A1 | 7/2015 | Van Dam et al. |
| 2017/0321443 A1 | 11/2017 | Biffiger et al. |

FOREIGN PATENT DOCUMENTS

| | | |
|---|---|---|
| CN | 107390750 A | 11/2017 |
| CN | 107570047 A | 1/2018 |
| DE | 3832915 A1 | 3/1990 |
| DE | 3924455 A1 | 1/1991 |
| DE | 102004026338 A1 | 12/2005 |
| EP | 0410098 A2 | 1/1991 |
| FR | 2819536 A1 | 7/2002 |
| GB | 2491974 A | 12/2012 |
| JP | 2012513649 A | 6/2012 |
| JP | 2013501915 A | 1/2013 |
| WO | 2009/002334 A1 | 12/2008 |
| WO | 2010/075389 A2 | 7/2010 |
| WO | 2011/022325 A2 | 2/2011 |
| WO | 2016065056 A1 | 4/2016 |
| WO | 2017/192595 A1 | 11/2017 |
| WO | 2017192286 A1 | 11/2017 |

OTHER PUBLICATIONS

Great Britain Search Report for GB Application No. 1718917.6 dated May 16, 2018 (7 pages).
Office Action Issued in Japanese Patent Application No. 2020-526903, dated Oct. 24, 2022 with English Summary (12 Pages).
Office Action Issued in European Patent Application No. 18810921.9, dated Feb. 1, 2023, 106 pages.
Sahay et al., "Automated Drop-on-Demand System with Real-Time Gravimetric Control for Precise Dosage Formulation", Journal of Laboratory Automation, vol. 18, No. 2, pp. 152-160, Apr. 24, 2012, pp. 152-153.
Alomari et al., "Personalised dosing: Printing a dose of one's own medicine", International Journal of Pharmaceutics, vol. 494, No. 2, pp. 568-577, Oct. 30, 2015, entire document.
Davy Acke, "Evaluation of microreactor technology for multicomponent reactions" Diss. Ghent Univ., 2007, online, retrieved on Jul. 5, 2017, Retrieved from the Internet URL:https://biblio.ugent.be/publication/468473, pp. 1-2, 32-40.

METHOD AND SYSTEM FOR MANUFACTURING OF BIOPHARMACEUTICAL PRODUCTS

CROSS REFERENCE TO RELATED APPLICATIONS

This application is a continuation of U.S. application Ser. No. 16/763,787 filed on May 13, 2020, which claims the priority benefit of PCT/EP2018/081416 filed on Nov. 15, 2018, which claims priority benefit of Great Britain Patent Application No. 1718917.6 filed on Nov. 16, 2017, the entire contents of which are hereby incorporated by reference herein.

TECHNICAL FIELD

The present disclosure relates to a volume tailorable manufacturing system and a method for quality assured manufacturing of biopharmaceutical products associated with a biosafety level classification.

BACKGROUND

With the ever-increasing development of novel biopharmaceutical compounds, there is a corresponding need to build specialized manufacturing production facilities to accommodate production of such biopharmaceutical compounds. Biopharmaceutical production puts high demand on biosafety to prevent loss of prevention of biological integrity, e.g., through release of harmful chemicals and/or organisms into the environment.

Biosafety is a term used to describe prevention mechanisms and measures required for the handling of biohazardous substances, such as biopharmaceutical compounds. Biosafety is used to protect from harmful incidents. Many laboratories handling biohazards employ an ongoing risk management assessment and enforcement process for biosafety following as categorized by a biosafety level referring to biocontainment precautions for laboratory work with infectious materials. Thus, a biosafety level is a set of biocontainment precautions required to isolate dangerous biological agents in an enclosed laboratory facility. The levels of containment range from the lowest biosafety level 0 (BSL-0) to the highest at level 4 (BSL-4).

At the lowest level of biosafety, precautions may consist of regular hand-washing and minimal protective equipment. At higher biosafety levels, precautions may include airflow systems, multiple containment rooms, sealed containers, positive pressure personnel suits, established protocols for all procedures, extensive personnel training, and high levels of security to control access to the facility. Consequently, the higher the biosafety level, the higher the production cost and the higher the cost for providing production facilities capable of enabling such production.

The development of novel biopharmaceutical compounds typically requires large investments in time and capital to translate scientific discovery into new medicine and to build specialized manufacturing facilities and equipment. Advanced technologies drive biopharmaceutical manufacturing that aligns with research and development, and requires considerable scientific know-how and infrastructure. Additionally, new medicines increase the need for more complex manufacturing processes, more advanced equipment, and higher biosafety levels.

Since biopharmaceutical production of higher biosafety levels requires customized production facilities as well as extensive and continuous personnel training, there are geographic limitations in the expansion of production. It is usually more cost beneficial to increase production in an area where a production facility has already been established rather than to establish production in a new geographic location. Through geographic clustering it has heretofore been possible to address staffing and supply aspects in a more effective manner, but the time and cost of tailoring the production volume, e.g., by expanding, of the production infrastructure, i.e., the production plant, represent a significant obstacle to an increased production. Overall, present production trends indicate that there is a need for improved manufacturing flexibility with uncompromised quality, while creating operating efficiencies that can help reduce costs.

SUMMARY

An object of the present disclosure is to provide solutions which seek to mitigate, alleviate, or eliminate one or more of the above-identified deficiencies in the art and to provide solutions for flexible and cost-effective manufacturing of biopharmaceutical products, and more specifically to a volume tailorable manufacturing system for manufacturing according to a predetermined biosafety level classification.

According to a first aspect, this object is achieved by a volume tailorable manufacturing system for quality assured manufacturing of biosafety level classified biopharmaceutical products, the volume tailorable manufacturing system comprising one or more multi-product suites and a control facility configured to control a unidirectional flow in a circulation system of the one or more multi-product suites. The circulation system is configured to interconnect the one or more multi-product suites and comprises separated supply and return systems. The supply system comprising at least one inlet, the return system comprising at least one outlet that is paired with the inlet and provided at a spatially predetermined position from the inlet, and each inlet/outlet pair comprises a seal when not connected to an adjacent multi-product suite.

The volume tailorable manufacturing system provides the advantage of allowing an unprecedented flexibility in scale; both with regard to production volume flexibility and with regard to time to production inauguration.

In some embodiments, each inlet/outlet pair is prepared for connection to a further inlet/outlet pair of a further multi-product suite and the seal of an inlet/outlet pair is configured to be broken to expand the volume tailorable manufacturing system with the further multi-product suite. In an alternative embodiment, each inlet/outlet pair is prepared for connection to a further inlet/outlet pair of a further multi-product suite and an inlet/outlet pair is configured to be sealed when the connection to the further inlet/outlet pair is discontinued. Accordingly, the disclosed volume tailorable manufacturing system allows for easy production expansion or production limitation by adding or removing a further multi-product suite.

In some embodiments, first and second multi-product suites are comprised in the volume tailorable manufacturing system, an inlet/outlet pair of the first multiproduct suite is connected to an inlet/outlet pair of the second multiproduct suite, and the control facility is configured to control a unidirectional flow in a circulation system interconnecting the first and second multi-product suites.

In some embodiments, the supply system is configured as a central spine within a centre portion of the volume tailorable manufacturing system and is at least partly enclosed by the one or more multi-product suites. The return system of each multi-product suite is configured as a passage along a perimeter of the volume tailorable manufacturing system.

In some embodiments, each multi-product suite comprises a first communication interface to the supply system and a second communication interface to the return system.

In some embodiments, the biosafety level classification is BioSafetyLevel 2, BSL2.

In some embodiments, each multi-product suite is inter-operationally discrete from the other multi-product suites.

In some embodiments, the one or more multi-product suites are micro modules configured for biopharmaceutical manufacturing, and wherein the separated supply and return systems are connected to a macrostructure comprising a hydration facility and warehouse facility.

According to a second aspect, the above mentioned object is also achieved by a method for expanding a production volume capability of a manufacturing system for quality assured manufacturing of biopharmaceutical products associated with a biosafety level classification. The manufacturing system comprises a first multi-product suite and a control facility configured to control a unidirectional flow in a circulation system of the first multi-product suites. The circulation system comprises separated supply and return systems. The supply system comprises an inlet, the return system comprises an outlet that is paired with the inlet and provided at a spatially predetermined position from the inlet, and the inlet/outlet pair comprises a seal. The method comprises a step of arranging a second multi-product suite in a position adjacent to the first multi-product suite so that a spatially predetermined position of an inlet/outlet pair of the second multi-product suite is arranged to mirror the spatially predetermined position of an inlet/outlet pair of the first multi-product suite. The method further comprises a step of interconnecting the inlet/outlet pair of the first multi-product suite with the inlet/outlet pair of the second multi-product suite and breaking the seal of each inlet/outlet pair.

In some embodiments, the biosafety level classification is BioSafetyLevel 2, BSL2.

In some embodiments the interconnecting comprises validating that a connection formed between the inlet/outlet pair of the first multi-product suite and the inlet/outlet pair of the second multi-product suite complies with requirements for quality assured manufacturing of BioSafetyLevel 2, BSL2, classified biopharmaceutical products and breaking the seal following such validation.

In some embodiments, the quality assured manufacturing of the biopharmaceutical products associated with a biosafety level classification has been validated for each of the first and second multi-product suites and includes validation of respective inlet/outlet pairs, wherein validation of the second multi-product suite is uncorrelated to validation of the first multi-product suite and wherein the validation of respective inlet/outlet pairs comprises pre-validating a connection to be formed.

According to a third aspect, the above mentioned object is also achieved by a method for decreasing production volume capability of a manufacturing system for quality assured manufacturing of biopharmaceutical products associated with a biosafety level classification. The manufacturing system comprises at least two multi-product suites and a control facility configured to control a unidirectional flow in a circulation system of the one or more multi-product suites. The circulation system is configured to interconnect the one or more multi-product suites and comprises separated supply and return systems. Each multi-product suite comprises at least one inlet to the supply system and at least one outlet from the return system, wherein the outlet is paired with the inlet and provided at a spatially predetermined position from the inlet. The two multi-product suites are arranged in adjacent positions having an inlet/outlet pair of the first multi-product suite interconnected with an inlet/outlet pair of the second multi-product suite. The method comprises to disconnect the first and second multi-product suites by sealing the inlet/outlet pair of the first multi-product suite and/or the second multi-product suite and adapting the control facility to control a unidirectional flow in a circulation system of the first multi-product suite.

BRIEF DESCRIPTION OF DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Various embodiments of a volume tailorable manufacturing system and a method for tailoring a production volume capability of a manufacturing system will be described more fully hereinafter with reference to the accompanying drawings, in which some, but not all embodiments of the manufacturing system and associated method is disclosed. Advantages and features of the present disclosure and methods to achieve them will become apparent from the below description of exemplary embodiments. However, the present disclosure is not limited to the exemplary embodiments disclosed herein but may be implemented in various different ways. The exemplary embodiments are provided for making the disclosure of the present disclosure thorough and for fully conveying the scope of the present disclosure to those skilled in the art. It is to be noted that the scope of the present disclosure is defined solely by the claims.

The terminology used herein is for the purpose of describing particular aspects of the disclosure only, and is not intended to limit the scope of the disclosure. As used herein, the singular forms "a", "an" and "the" are intended to include the plural forms as well, unless the context clearly indicates otherwise.

It should be noted that the word "comprising" does not necessarily exclude the presence of other elements or steps than those listed. It should further be noted that any reference signs do not limit the scope of the claims.

Detailed descriptions of well-known functions and structures incorporated herein will be omitted to avoid obscuring the subject matter of the present disclosure. Further, terms or words used in the specification and claims shall not be construed merely in a conventional and dictionary definition but shall be construed in a meaning and concept corresponding to the technical idea of the present invention.

Figure 1:
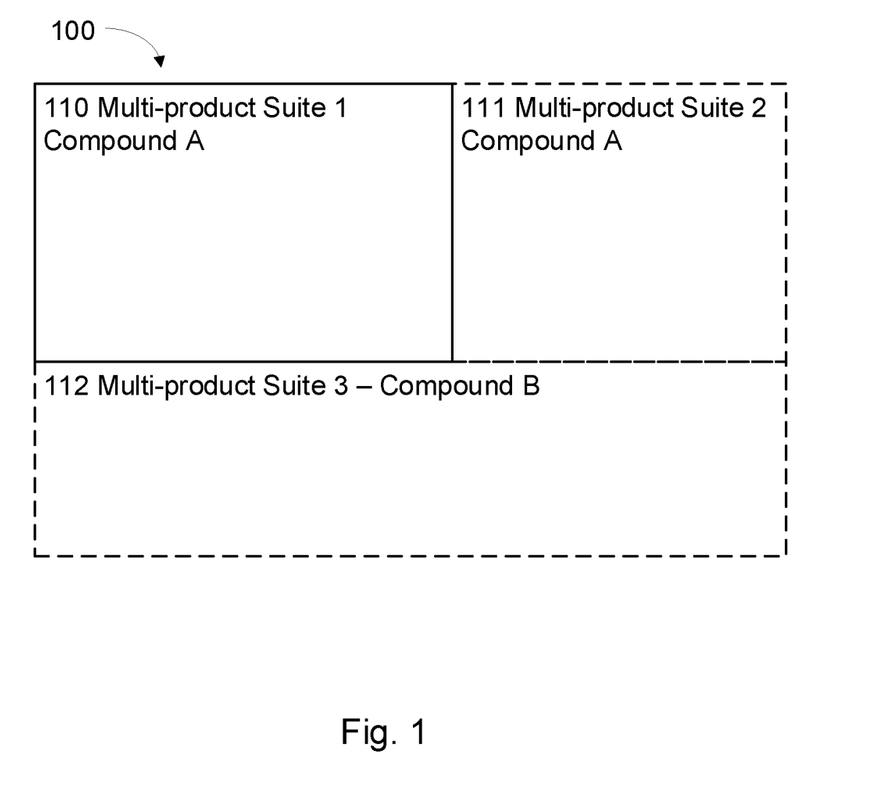
FIG. 1 illustrates an example schematic arrangement of a volume tailorable manufacturing system of the present disclosure.

FIG. 1 illustrates an example configuration of a volume tailorable manufacturing system that may be used in conjunction with various embodiments of the present invention for volume tailorable quality assured manufacturing of biopharmaceutical products associated with a biosafety level classification. The volume tailorable manufacturing system 100 disclosed in FIG. 1 comprises a first multi-product suite 110, e.g., for manufacturing of a $1^{st}$ compound, and optional $2^{nd}$ and $3^{rd}$ multi-product suites 111, 112, wherein the $2^{nd}$ multi-product suite 111 may be introduced to enable a scale increase of the production of compound A. The $3^{rd}$ multi-product suite 112 is disclosed as enabling a more varied production at within the manufacturing system, e.g., by producing compound B in the expanded production facility. The $3^{rd}$ multi-product suite 112 may of course also be used for compound A, should there be a need for significantly increasing the production of this compound. Also, while the $1^{st}$ and $2^{nd}$ multi-product suites 110, 111 are indicated as being dedicated to production of compound A, they may in fact be used for production of multiple compounds and the $1^{st}$ and $2^{nd}$ multi-product suite 110, 111 may comprise a number of biopharma production environments that are separated from one another, but joined to a unidirectional circulation system of the multi-product suites. A control facility, arranged within one or more of the multi-product suites, is configured to control a unidirectional flow in the circulation system of the one or more multi-product suites. The circulation system is configured to interconnect the one or more multi-product suites as well as providing a circulation system within each multi-product suite. As will be discussed further below, with reference to FIGS. 2a-c, the circulation system comprises separated supply and return systems, the supply system comprising at least one inlet, the return system comprising at least one outlet that is paired with the inlet and provided at a spatially predetermined position from the inlet, and each inlet/outlet pair comprises a seal when not connected to an adjacent multi-product suite. According to some aspects, the inlet and outlet are arranged on the same floor level of a building block.

Figure 2A:
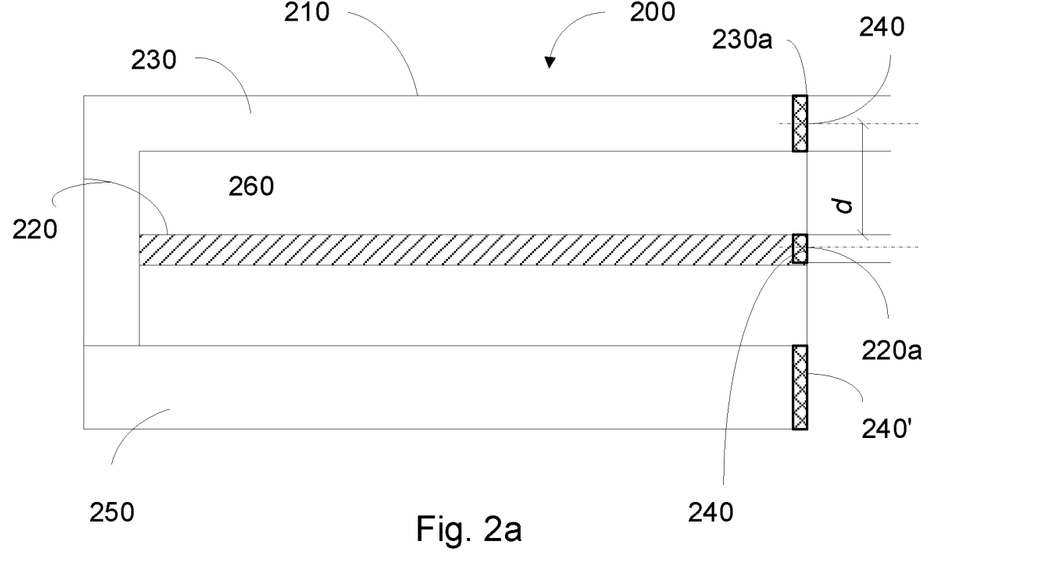
FIG. 2a illustrates an example configuration of the volume tailorable manufacturing system comprising a $1^{st}$ multi-product suite.

FIG. 2a illustrates an example embodiment of a volume tailorable manufacturing system architecture that may be used in conjunction with various embodiments of the present invention for volume tailorable quality assured manufacturing of biopharmaceutical products associated with a biosafety level classification. Initially, the volume tailorable manufacturing system 200 of the present disclosure comprises a first multi-product suite 210 and a control facility, e.g., a processor arranged within an area of the manufacturing system, within a separate control centre or as a cloud solution. The control facility is configured to control a unidirectional flow in a circulation system of the multi-product suite 210. The circulation system is configured to interconnect the one or more multi-product suites. The circulation system is also configured to allow circulation of personnel, raw material, products and waste as required for complying with the biosafety level classification of the production facility, i.e., the multi-product suite. According to some aspects of the disclosure, the biosafety level classification is BioSafetyLevel 2, BSL2 implying that the flow of personnel, raw, material, products and waste is a unidirectional flow. Complying with the BSL2 requirements, any type of biopharmaceutical production requiring BSL1 or BSL2 may be manufactured within the multi-product suites of the manufacturing facility. Such biomolecules comprise mAbs, Rec proteins, vaccines, viral vectors, insulins, etc.

As disclosed in FIG. 2a, the circulation system comprises separated supply and return systems, the supply system 220 comprising at least one inlet 220a, the return system 230 comprising at least one outlet 230a that is paired with the inlet 220a and provided at a spatially predetermined position from the inlet, e.g., having each inlet 220a and outlet 230a arranged with a predetermined respective width and arranged at a predetermined distance d from one another. Each inlet/outlet pair 220a/230a comprises a seal 240 when not connected to an adjacent multi-product suite, e.g., sealing the inlet 220a with a first part of the seal 240 and sealing the outlet 230a with a second part of the seal 240, whereby the first and the second part of the seal 240 may be physically separated from one another. According to some aspects, the inlet and outlet are arranged on the same floor level of a building block.

The manufacturing system 200 further comprises clean room areas 260, i.e., areas in which the biocontainment precautions stipulated by a given biosafety level classification must be complied with. In addition to the return system, examples of areas where such biocontainment precautions must be observed comprise a seed area, a USP area, a DSP area and lab areas. The manufacturing system 200 also comprises preparatory areas 250 that provide key contributions to the biopharmaceutical manufacturing, but without the need for strict biocontainment precautions. Such areas comprise entrances, offices, storages, utility areas, support areas, media preparation areas and buffer preparation areas. Some further details relating to the production flow between these areas will be presented below with reference to FIG. 5.

Figure 2B:
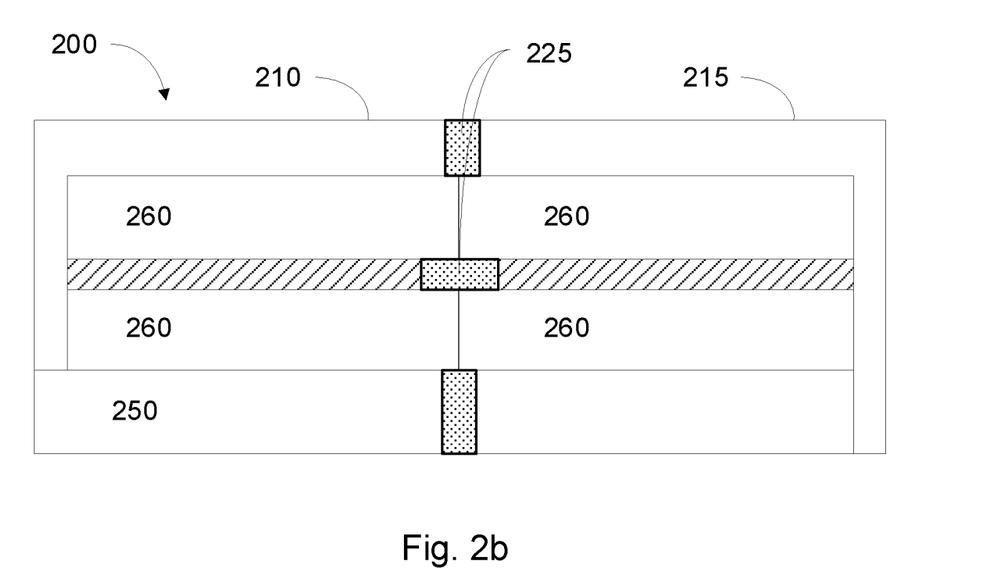
FIG. 2b illustrates an example configuration of the volume tailorable manufacturing system comprising interconnected $1^{st}$ and $2^{nd}$ multi-product suites.

In some embodiments, each inlet/outlet pair 220a, 230a is prepared for connection to a further inlet/outlet pair of a further multi-product suite and wherein the seal 240 of an inlet/outlet pair is configured to be broken to expand the volume tailorable manufacturing system with the further multi-product suite. In some embodiments, each inlet/outlet 220a, 230a pair is prepared for connection to a further inlet/outlet pair of a further multi-product suite and an inlet/outlet pair is configured to be sealed with a seal 240 when the connection to the further inlet/outlet pair is discontinued. The disclosure of FIG. 2a also depicts a seal 240' at the end of the preparatory area 250. Since the biosafety level classification does not apply to this area, the interconnection of this area with a corresponding preparatory area of an adjacent multi-product suite does not require the safety level validation. The ability to accomplish a quick connection also of these areas may provide user benefits; thus, the multi-product suites may be configured with a breakable seal also in this FIG. 2b illustrates an example embodiment of a manufacturing system architecture that may be used in conjunction with an embodiment whereby the manufacturing volume is tailored for increased production. As for the embodiment of FIG. 2a, the production relates to quality assured manufacturing of biopharmaceutical products associated with a biosafety level classification. In the disclosure of FIG. 2b, the $1^{st}$ and $2^{nd}$ multi-product suite has been connected so that that the volume tailorable manufacturing system 200 here comprises a first and a second multi-product suites 210, 215. An inlet/outlet pair providing access to the separated supply and return system of the first multiproduct suite is connected to an inlet/outlet pair providing access to the separated supply and return system of the second multiproduct suite. The control facility is configured to control a unidirectional flow in a circulation system formed by the supply and return system that interconnect the first and second multi-product suites. If the $1^{st}$ and $2^{nd}$ multi-product suite have been validated for the same biosafety level classification, e.g., BSL 2, validation of the connection area 225, formed when connecting the two multi-product suites and breaking the seal will be possible with for the corresponding biosafety level classification in an expedited manner due to the pre-validation of the respective parts of the manufacturing system. Consequently, a main benefit of the present disclosure is the ability to offer scalable production, adapted for strict biocontainment precautions, which only require validation of a connecting structure prior to use.

In the disclosure of FIG. 2b, the connection between inlet/outlet pairs of two adjacent multi-products suites is formed by matching the position of these inlet/outlet pairs. However, in some embodiments, the interconnection may be achieved by using intermediary connectors between the respective inlet/outlet pairs. Such a solution provides the advantage that two multi-product suites may be joined together also when there are environmental obstacles to arranging the multi-product suites immediately adjacent one another. When using one or more intermediary connectors, each connector would be sealed prior to installation, and the procedure disclosed below for establishing a connection between two multi-product suites would be used for each connection formed between a multi-product suite and an intermediary connector.

In some embodiments, the supply system 220 is configured as a central spine within a centre portion of the volume tailorable manufacturing system and being at least partly enclosed by the one or more multi-product suites, e.g., enclosed by the clean room areas 260. According to embodiments, the return system 230 of each multi-product suite may be configured as a passage along a perimeter of the volume tailorable manufacturing system and at least partly enclosing the clean room areas.

Figure 2C:
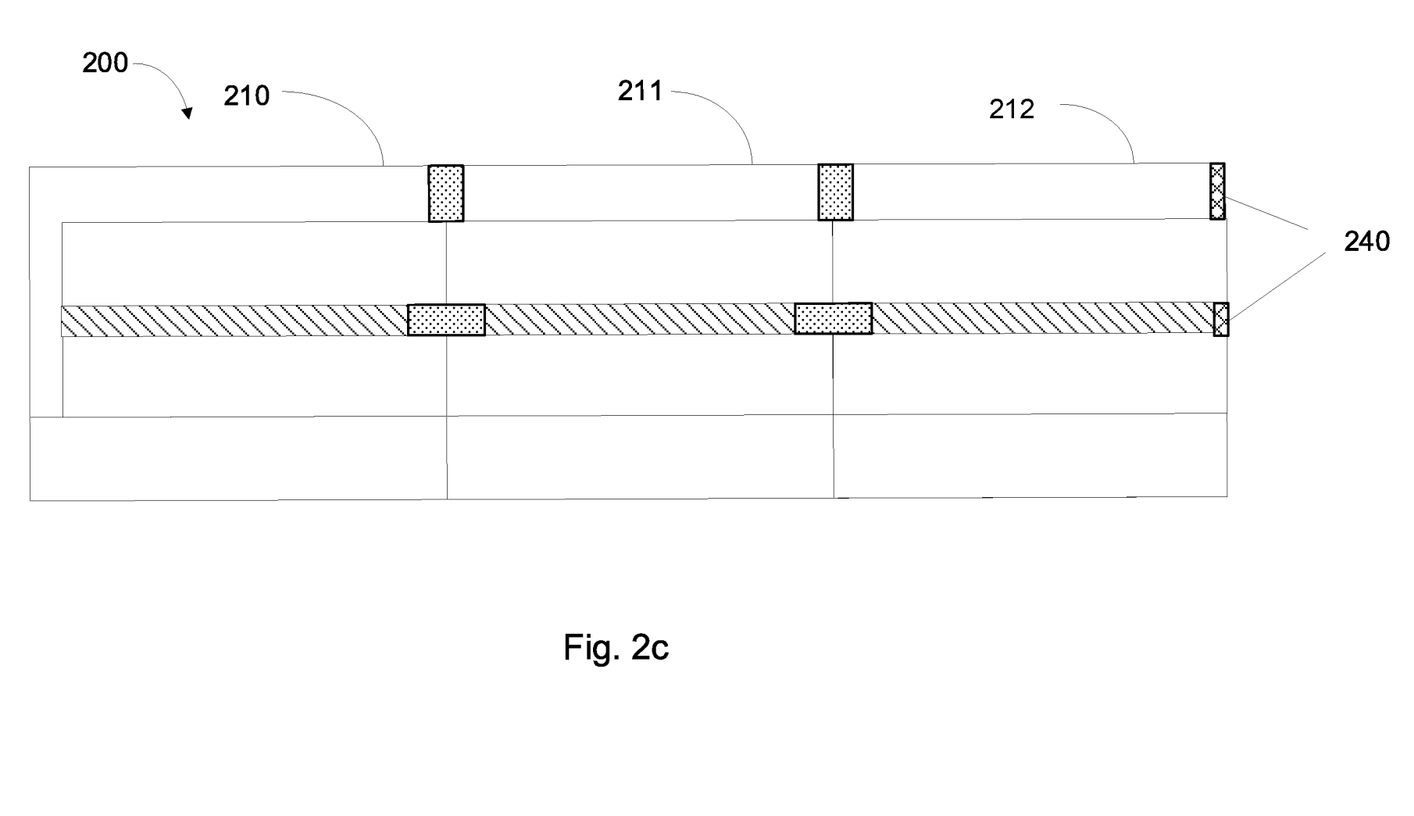
FIG. 2c illustrates an example configuration of the volume tailorable manufacturing system comprising interconnected $1^{st}$ to $3^{rd}$ multi-product suites.

FIG. 2c illustrates an example embodiment of a manufacturing system architecture that may be used in conjunction with various embodiments of the present invention for volume tailorable quality assured manufacturing of biopharmaceutical products associated with a biosafety level classification. In the disclosure of FIG. 2c, an expanded manufacturing system 200 has been achieved using multi-product suites 211, 212 configured to be connected to further multi-products suites. Consequently, $2^{nd}$ and a $3^{rd}$ multi-product suites 211, 212 each comprises two inlet/outlet pairs having respective outlets provided at spatially predetermined positions from corresponding inlets, and each inlet/outlet pair comprising a seal 240 when not connected to an adjacent multi-product suite. In some embodiments, each multi-product suite is inter-operationally discrete from the other multi-product suites, implying that a compound A may be manufactured in a first multi-product suite, while a compound B is manufactured in a second multi-product suite that share a circulation system with the first multi-product suite. When performing manufacturing under the requirements of BSL 2, supply of fresh air may be supplied to the first and second multi-product suite from a common air handler unit, however, each suite will have its own air circulation system that is independent of that of other suites in order to fulfil the BSL 2 requirements. It is of course also possible to use independent air handler units for each multi-product suite. While this will represent a slight increase the cost of the infrastructure required for the manufacturing, an advantage of having separation also of such supply systems is the shorter disruption occurring during the phase of expanding the manufacturing system with one or more further multi-product suites.

Figure 3:
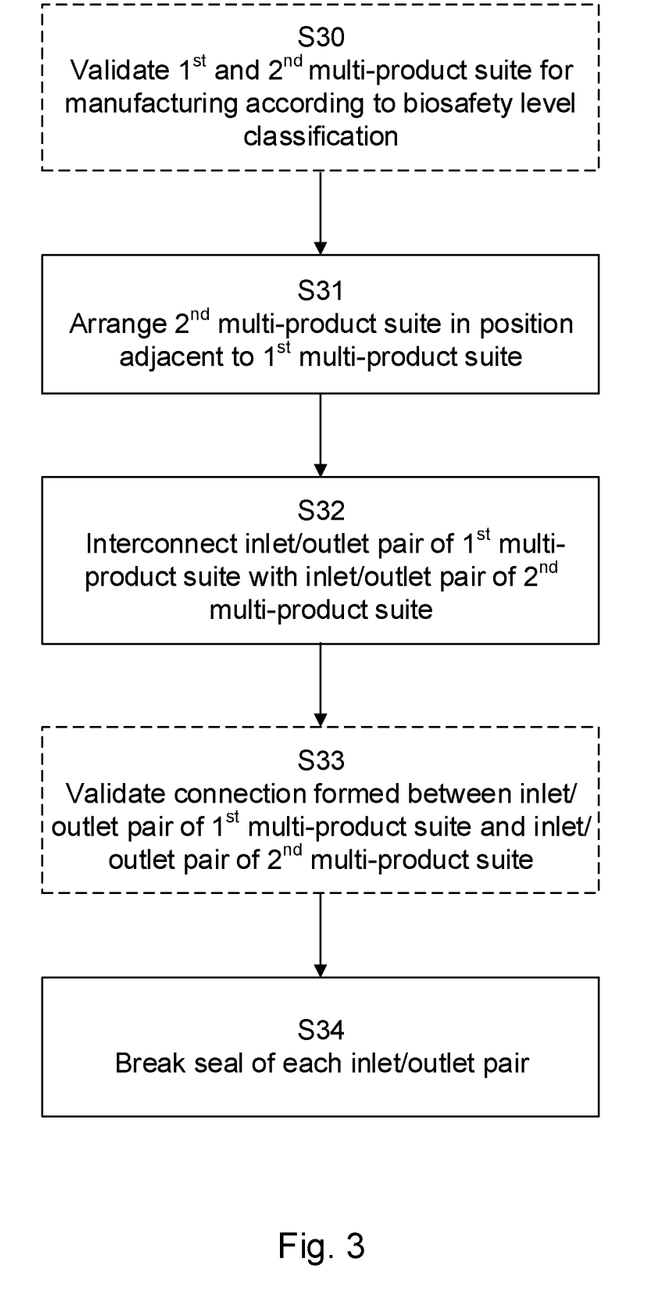
FIG. 3 is a flowchart illustrating example method steps according to some embodiments.

Turning to FIG. 3, a method for expanding a production volume capability of a manufacturing system for quality assured manufacturing of biopharmaceutical products associated with a biosafety level classification is disclosed. The manufacturing system comprises one or more multi-product suites, e.g., as disclosed in FIGS. 2a-c, and a control facility configured to control a unidirectional flow in a circulation system of the one or more multi-product suites. The circulation system is configured to interconnect the one or more multi-product suites and comprises separated supply and return systems. The supply system comprises an inlet, the return system comprises an outlet that is paired with the inlet and provided at a spatially predetermined position from the inlet, and the inlet/outlet pair comprises a seal. The method comprises arranging S31 a second multi-product suite in a position adjacent to the first multi-product suite so that a spatially predetermined position of an inlet/outlet pair of the second multi-product suite is arranged to mirror the spatially predetermined position of an inlet/outlet pair of the first multi-product suite. In a subsequent step, the inlet/outlet pair of the first multi-product suite is interconnected S32 with the inlet/outlet pair of the second multi-product suite; and the seal of each inlet/outlet pair is broken S34.

In some embodiments, the method comprises validating the $1^{st}$ multi-product suite for manufacturing according to biosafety level classification and/or validating the $2^{nd}$ multi-product suite for manufacturing according to biosafety level classification prior to installation of the multi-product suites, wherein the validating of the respective multi-product suits is performed independent of the validating of the other multi-product suite, i.e., representing a pre-validation process for the respective production facilities. Thus, in some embodiments, the quality assured manufacturing of the biopharmaceutical products associated with a biosafety level classification has been validated for each of the first and second multi-product suites and includes validation of respective inlet/outlet pairs, wherein validation of the second multi-product suite is uncorrelated to validation of the first multi-product suite and wherein the validation of respective inlet/outlet pairs comprises pre-validating a connection to be formed. In some embodiments, the validation is performed for biosafety level classification BioSafetyLevel 2, BSL2.

In some embodiments, the interconnecting comprises validating S33 that a connection formed between the inlet/outlet pair of the first multi-product suite and the inlet/outlet pair of the second multi-product suite complies with requirements for quality assured manufacturing of BioSafetyLevel 2, BSL2, classified biopharmaceutical products and breaking S34 the seal only following such validation.

Figure 4:
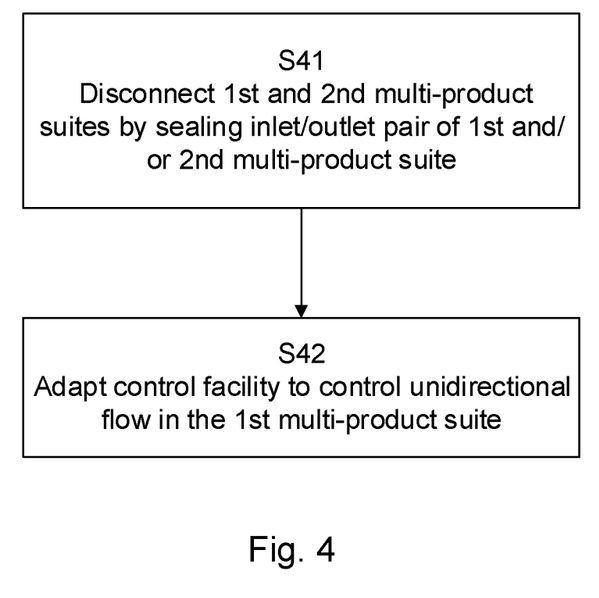
FIG. 4 is a flowchart illustrating example method steps according to some embodiments.

Turning to FIG. 4, a method for decreasing a production volume capability of a manufacturing system for quality assured manufacturing of biopharmaceutical products associated with a biosafety level classification is disclosed. The manufacturing system comprises two more multi-product suites, e.g., as disclosed in FIG. 2b or c, and a control facility configured to control a unidirectional flow in a circulation system of the one or more multi-product suites. The circulation system is configured to interconnect the one or more multi-product suites and comprises separated supply and return systems. Each multi-product suite comprises at least one inlet to the supply system and at least one outlet from the return system, wherein the outlet is paired with the inlet and provided at a spatially predetermined position from the inlet. The two multi-product suites are arranged in adjacent positions having an inlet/outlet pair of the first multi-product suite interconnected with an inlet/outlet pair of the second multi-product suite. The method comprises to disconnect S41 the first and second multi-product suites by sealing the inlet/outlet pair of the first multi-product suite and/or the second multi-product suite and adapting S42 the control facility to control a unidirectional flow in a circulation system of the first multi-product suite.

Figure 5:
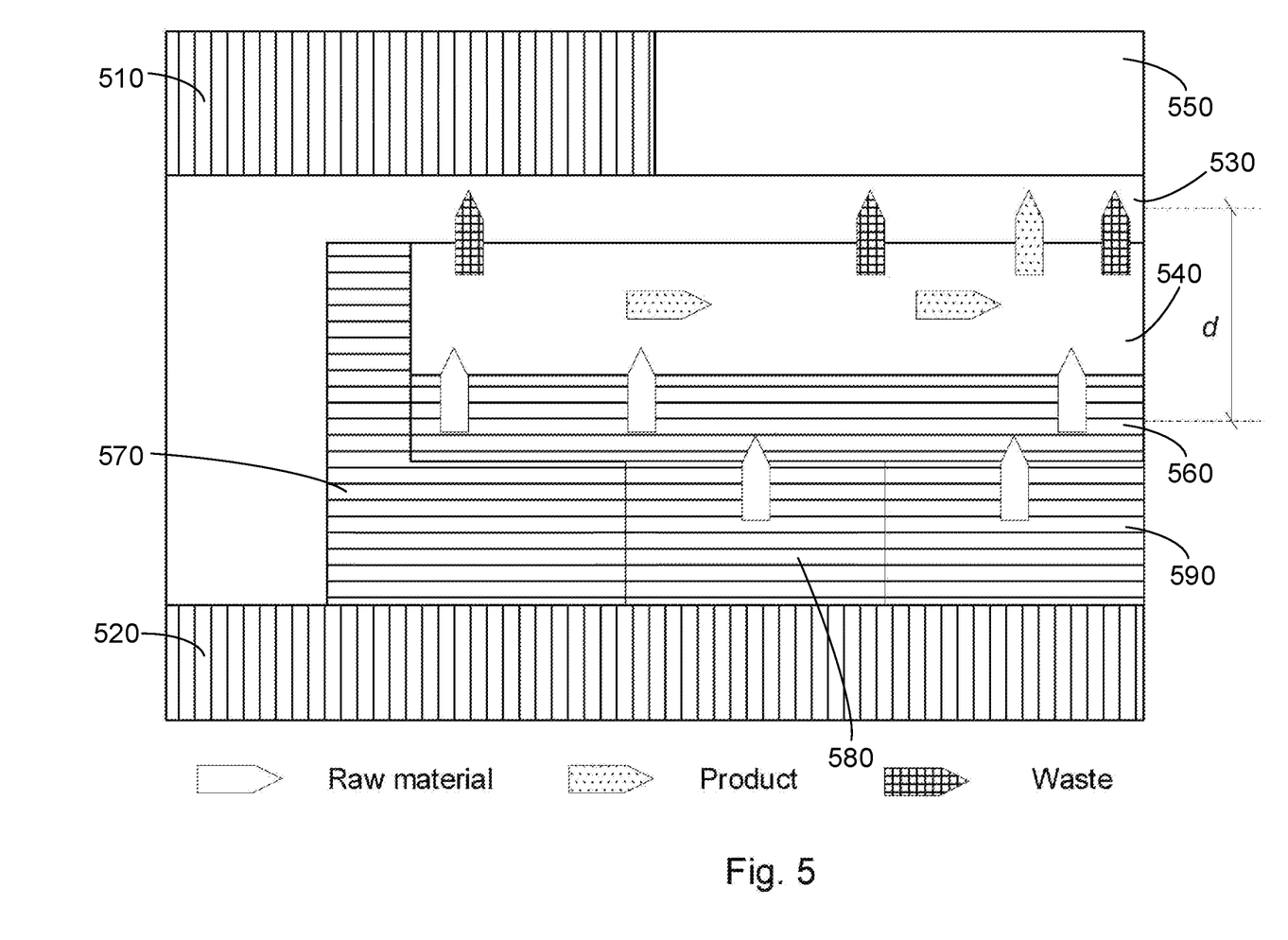
FIG. 5 discloses an example configuration of a multi-product suite and flows for manufacturing of biohazardous compounds.

Turning to FIG. 5, details are schematically provided for the above discussed volume tailorable manufacturing system comprising a multi-product suite configured for BSL2. In the disclosure of FIG. 5, areas subject to corresponding biosafety level requirements are indicated with corresponding patterns. The arrows are used to disclose various flows of raw material, products and waste that may occur in the manufacturing system. The manufacturing system comprises utilities areas 510 and entrance/office/storage areas 520 that are not subjected to specific biocontainment precaution requirements. The manufacturing system also comprises an entry corridor 560, support areas 570, media preparation areas 580 and buffer preparation areas 590 that require some safety precautions but where these precautions do not fulfil the BSL2 requirements. Areas where the specific requirements of BSL2 must be observed comprise an exit corridor 530, i.e., a return system, and clean room facilities, i.e., a multiproduct suite 540 comprising a seed area, a USP area, a DSP area. The disclosure of FIG. 5 indicates that the seed area and USP area should be subjected to the BSL2 requirements, but embodiments where different safety requirements apply to different areas within the biosafety environment are also within the scope of the present disclosure. There is a supply of personnel, raw material to the biosafety areas from the entry corridor 560, i.e., a supply system. The raw material may be received in the supply system from a media preparation area 580 or a buffer preparation area 590, as illustrated by the arrows in FIG. 5. There may also be support areas/labs 550, wherein BSL2 requirements must be observed. The entry and exit corridors, i.e., the supply and return systems, are arranged at a distance d from one another. When seeking to expand the manufacturing system, a corresponding, mirrored production facility may be arranged adjacent to the multiproduct suite of FIG. 5 and connected to the multiproduct suite. As illustrated in FIG. 5, there may be different safety requirements associated with the supply and return system, which may impact the requirements on the respective connections between two adjoining multiproduct suites.

According to some embodiments, each multi-product suite comprises a first communication interface to the supply system and a second communication interface to the return system. The first communication interface may comprise a materials delivery interface, e.g., for delivery of raw material as illustrated in FIG. 5. The second communication interface may comprise a product delivery interface. In some embodiments, the materials delivery interface and the product delivery interface are provided by means of air locks. In some embodiments, the materials delivery comprise supply material delivered to a designated multi-product suite in single-use equipment, the supply material comprising customized culture media and/or buffer. In some embodiments, the multi-product suites are arranged to receive materials delivery of single-use product contact components.

In some embodiments, each multi-product suite comprises at least one further communication interface, also called a personnel access interface, controlled by a control unit in the multi-product suite and wherein the at least one further communications interface is arranged to control access of personnel to/from the multi-product suite. In some embodiments, the one or more multi-product suites are micro modules configured for biopharmaceutical manufacturing, and wherein the separated supply and return systems are connected to a macrostructure comprising a hydration facility and warehouse facility.

Figure 6:
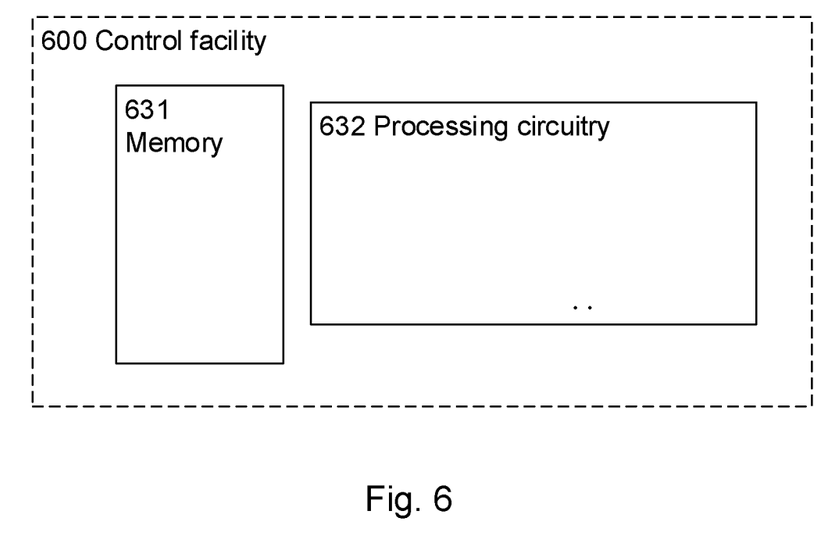
FIG. 6 shows a schematic diagram of an example control facility.

FIG. 6 shows a schematic diagram of an example control facility 600 configured for controlling a unidirectional flow in a circulation system of the one or more multi-product suites. The control facility comprises a memory 631, processing circuitry 632, and input device 633. The control facility may also comprise data interface providing data connectivity with the circulation system and the supply and return system comprised in the circulation system.

In general, the term processing circuitry may refer to, for example, one or more computers, computing entities, distributed systems, processing devices, processing entities, and/or any combination of devices or entities adapted to perform the functions, operations, and/or processes described herein. Such functions, operations, and/or processes may include, for example, transmitting, receiving, operating on, processing, storing, creating/generating, and/or similar terms used herein.

The control facility 600 is configured to execute a computer program product comprising at least one non-transitory computer readable storage medium having computer-executable program code instructions store therein. When executing the program code instructions in the processing circuitry 632, control of the unidirectional flow in a circulation system of the one or more multi-product suites may be achieved, i.e., controlling the unidirectional flow whereby personnel, raw material and other types of supply material is provide to the multi-product suites by means of a supply system of the circulation system and evacuated from the multi-products suites by means of the return system of the circulation system. In particular, the control facility is configured to ensure that there is no direct communication between the supply system and the return system.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated.

In the drawings and detailed description, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A volume tailorable manufacturing system for quality assured manufacturing of biopharmaceutical products associated with a biosafety level classification, the volume tailorable manufacturing system comprising one or more multi-product suites and a control facility configured to control a unidirectional flow in a circulation system of the one or more multi-product suites;
wherein the circulation system is configured to interconnect the one or more multi-product suites and wherein the circulation system comprises separated supply and return systems, the supply system comprising at least one inlet, the return system comprising at least one outlet that is paired with the inlet; and
wherein the supply system is configured as a central spine within a center portion of the volume tailorable manufacturing system and being at least partly enclosed by the one or more multi-product suites.

2. The volume tailorable manufacturing system of claim 1, wherein each inlet/outlet pair is prepared for connection to a further inlet/outlet pair of a further multi-product suite and wherein a seal of an inlet/outlet pair is configured to be broken to expand the volume tailorable manufacturing system with the further multi-product suite.

3. The volume tailorable manufacturing system of claim 1, wherein the or each inlet/outlet pair is prepared for connection to a further inlet/outlet pair of a further multi-product suite and an inlet/outlet pair is configured to be sealed when the connection to the further inlet/outlet pair is discontinued.

4. The volume tailorable manufacturing system of claim 1, wherein first and second multi-product suites are comprised in the volume tailorable manufacturing system, an inlet/outlet pair of the first multiproduct suite is connected to an inlet/outlet pair of the second multiproduct suite, and the control facility is configured to control a unidirectional flow in a circulation system interconnecting the first and second multi-product suites.

5. The volume tailorable manufacturing system of claim 1, wherein the return system of each multi-product suite is configured as a passage along a perimeter of the volume tailorable manufacturing system.

6. The volume tailorable manufacturing system of claim 1, wherein each multi-product suite of the one or more multi-product suites comprises a first communication interface to the supply system and a second communication interface to the return system.

7. The volume tailorable manufacturing system of claim 2, wherein the biosafety level classification is BioSafetyLevel 2, BSL2, and wherein the connection is validated prior to breaking the seal.

8. The volume tailorable manufacturing system of claim 1, wherein the one or more multi-product suites are micro modules configured for biopharmaceutical manufacturing, and wherein the separated supply and return systems are connected to a macrostructure comprising a hydration facility and warehouse facility.

9. The volume tailorable manufacturing system of claim 6, wherein the first communication interface comprises a materials delivery interface and the second communication interface comprises a product delivery interface.

10. The volume tailorable manufacturing system of claim 9, wherein the materials delivery interface and the product delivery interface are provided by means of air locks.

11. The volume tailorable manufacturing system of claim 9, wherein the materials delivery comprises supply material delivered to a designated multi-product suite in single-use equipment, the supply material comprising customized culture media and/or buffer.

12. The volume tailorable manufacturing system of claim 1, wherein the one or more multi-product suites are arranged to receive materials delivery of single-use product contact components.

13. The volume tailorable manufacturing system of claim 6, wherein each multi-product suite of the one or more multi-product suites comprises at least one further communication interface controlled by a control unit in the respective multi-product suite and wherein the at least one further communications interface is arranged to control employee access to/from the respective multi-product suite.

14. A method for expanding production volume capability of a manufacturing system for quality assured manufacturing of biopharmaceutical products associated with a biosafety level classification, the manufacturing system comprising a first multi-product suite and a control facility configured to control a unidirectional flow in a circulation system of the first multi-product suite; wherein the circulation system comprises separated supply and return systems, the supply system comprising an inlet, the return system comprising an outlet that is paired with the inlet, the method comprising
arranging a second multi-product suite in a position adjacent to the first multi-product suite so that a position of an inlet/outlet pair of the second multi-product suite is arranged to mirror the position of an inlet/outlet pair of the first multi-product suite;
interconnecting the inlet/outlet pair of the first multi-product suite with the inlet/outlet pair of the second multi-product suite; and
breaking a seal of each inlet/outlet pair, and
wherein the supply system is configured as a central spine within a center portion of the manufacturing system and being at least partly enclosed by the first or second multi-product suites.

15. The method of claim 14, wherein the interconnecting comprises validating that a connection formed between the inlet/outlet pair of the first multi-product suite and the inlet/outlet pair of the second multi-product suite complies with requirements for quality assured manufacturing of BioSafetyLevel 2, BSL2, classified biopharmaceutical products and breaking the seal following such validation.

16. The method of claim 14, wherein the quality assured manufacturing of the biopharmaceutical products associated with a biosafety level classification has been validated for each of the first and second multi-product suites and includes validation of respective inlet/outlet pairs, wherein validation of the second multi-product suite is uncorrelated to validation of the first multi-product suite and wherein the validation of respective inlet/outlet pairs comprises pre-validating a connection to be formed.

17. A method for decreasing production volume capability of a manufacturing system for quality assured manufacturing of biopharmaceutical products associated with a biosafety level classification, the manufacturing system comprising two or more multi-product suites and a control facility configured to control a unidirectional flow in a circulation system of the two or more multi-product suites; wherein the circulation system is configured to interconnect the two or more multi-product suites and wherein the circulation system comprises separated supply and return systems and wherein each multi-product suite of the two or more multi-product suites comprises at least one inlet to the supply system and at least one outlet from the return system, wherein the outlet is paired with the inlet and provided at a spatially predetermined position from the inlet, and the two or more multi-product suites are arranged in adjacent positions having the an inlet/outlet pair of a first multi-product suite of the two or more multi-product suites interconnected with an inlet/outlet pair of a second multi-product suite of the two or more multi-product suites; the method comprising:

disconnecting the first and second multi-product suites by sealing the inlet/outlet pair of the first multi-product suite and/or the second multi-product suite; and adapting the control facility to control a unidirectional flow in the first multi-product suite, and wherein the supply system is configured as a central spine within a center portion of the manufacturing system and being at least partly enclosed by the first or second multi-product suites.

18. The method of claim 17, further comprising distancing the second multi-product suite from the first multi-product suite by physically relocating the second multi-product suite to a new location.

* * * * *